United States Patent
Inoshita et al.

(10) Patent No.: US 7,024,102 B1
(45) Date of Patent: Apr. 4, 2006

(54) IMAGE DATA REPRODUCING METHOD, IMAGE DATA REPRODUCING APPARATUS, IMAGE DATA RECORDING METHOD AND IMAGE DATA RECORDING APPARATUS

(75) Inventors: Gen Inoshita, Tokyo-to (JP); Keizo Sugita, Tokyo-to (JP); Kyota Funamoto, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/439,771

(22) Filed: Nov. 15, 1999

(30) Foreign Application Priority Data

Nov. 17, 1998 (JP) .............................. P10-326937

(51) Int. Cl.
*H04N 5/917* (2006.01)

(52) U.S. Cl. .......................... 386/111; 386/46; 386/125

(58) Field of Classification Search .................. 386/33, 386/45, 98, 108–109, 111–112, 125–126, 386/46; 348/96; 382/232, 235

See application file for complete search history.

(56) References Cited

U.S. PATENT DOCUMENTS

| 5,541,644 A * | 7/1996 | Nanba .......................... 348/96 |
| 5,630,006 A | 5/1997 | Hirayama et al. |
| 5,999,698 A * | 12/1999 | Nakai et al. ................ 386/125 |
| 6,360,055 B1 * | 3/2002 | Kaneshige et al. ........... 386/70 |
| 6,381,398 B1 * | 4/2002 | Yamauchi et al. .......... 386/125 |
| 6,549,722 B1 * | 4/2003 | Okada et al. .................. 386/98 |

FOREIGN PATENT DOCUMENTS

| EP | 0 876 063 A2 | 11/1998 |
| EP | 0 888 018 A1 | 12/1998 |
| JP | 10-145735 | 5/1998 |
| JP | 10-255443 | 9/1998 |
| JP | 10-304309 | 11/1998 |

\* cited by examiner

*Primary Examiner*—James J. Groody
*Assistant Examiner*—Christopher Onuaku
(74) *Attorney, Agent, or Firm*—Pitney Hardin LLP

(57) ABSTRACT

A method of reproducing first images and second images simultaneously, synchronizing them with each other. The method includes the processes of: reading first image data representing the first images and second image data representing the second images from a recording medium; storing the first image data into a first memory device and storing the second image data into a second memory device; and separately and simultaneously decoding the first image data and the second image data by using a first decoding device and a second decoding device. In this method, each of the first image data and the second image data is divided into a plurality of data units each having an equal time length and an equal data size, and each of the data units of the first image data and each of the data units of the second image data are alternately arranged on the recording medium.

17 Claims, 11 Drawing Sheets

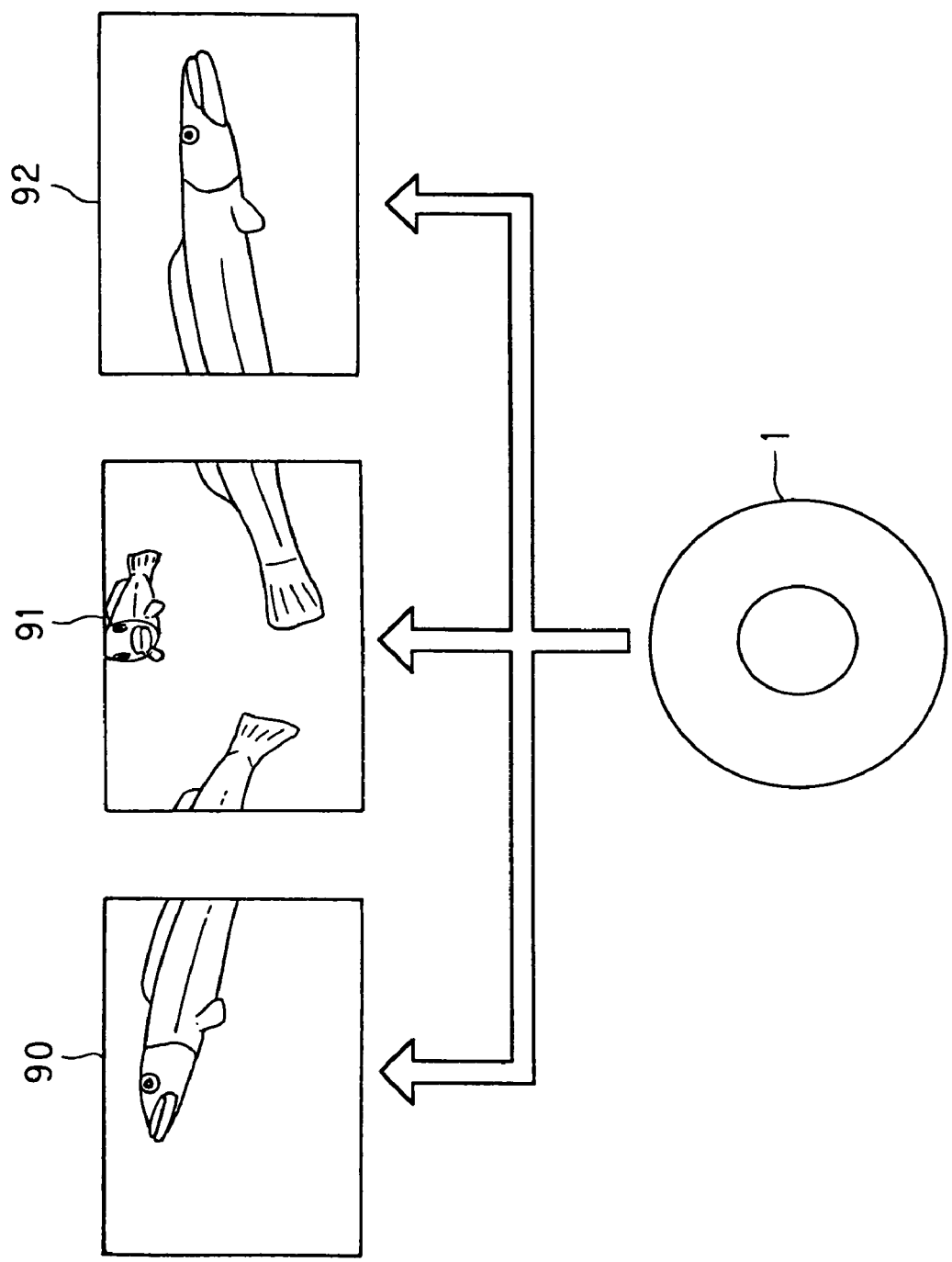

FIG. 1 1 A
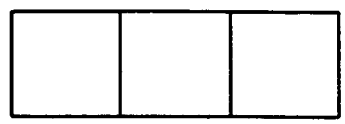
FIG. 1 1 B
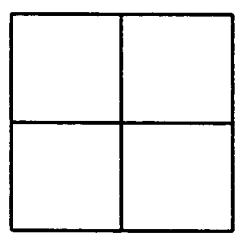
FIG. 1 1 C
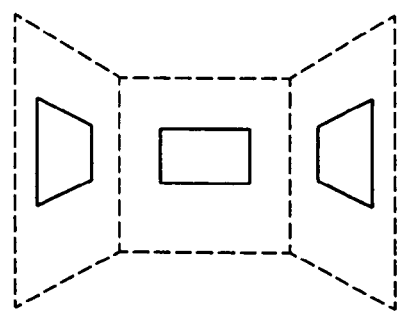
FIG. 1 1 D
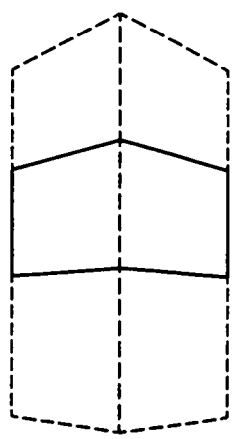

IMAGE DATA REPRODUCING METHOD, IMAGE DATA REPRODUCING APPARATUS, IMAGE DATA RECORDING METHOD AND IMAGE DATA RECORDING APPARATUS

BACKGROUND OF THE INVENTION

1. Field of the Invention

The present invention relates to an image data reproducing method and an image data reproducing apparatus for reading compressed image data from a recording medium so as to reproduce the image data, and relates to an image data recording method and an image data recording apparatus for compressing image data so as to write the compressed image data onto a recording medium.

2. Description of the Related Art

In recent years, DVD as an information recording medium which is capable of recording an extremely great capacity of data with high density has spread. Image data are recorded onto such a DVD by using a digital image compressing technique such as MPEG2 (Moving Picture Expert Group 2) so that an image with excellent image quality can be reproduced and a film can be reproduced for a long time.

A DVD video format is suggested as the standard for recording image data onto DVD. The DVD video format has a lot of functions in order to apply DVD widely to various uses. One example of the functions is a multi-angle function. An image imaged from a plurality of angles can be reproduced by using the multi-angle function while changing the angles. For example, an angle on a predetermined scene of a film or the like is selected by a user according to the user's preference, and the predetermined scene can be reproduced from the selected angle for a definite time.

In order to realize the multi-angle function, at the time when an angle is changed, it is necessary to change an on-reproducing image seamlessly without a break.

In order to realize the seamless reproduction, a recording method which is called interleaved recording is used for recording image data onto DVD. The interleaved recording is a technique to divide recording data into a plurality of interleaved units per each of the plural angles and record them alternatively onto the DVD. When one angle is selected from the plural angles and reproduction is executed, only an interleaved unit corresponding to the selected angle is extracted from the DVD, and the interleaved units are stored one after another onto a buffer memory. Then, the stored interleaved units are read one after another from the buffer memory so as to be reproduced. Since a speed of reading from DVD is faster than a speed of reproducing image data, as long as a capacity of the buffer memory is secured appropriately, the image data can be reproduced seamlessly. Further, an upper limit of a size in the interleaved units is limited in order to shorten a jump distance on DVD in an pick-up. This is because when the jump distance on the DVD in the pick-up is longer, a period for stopping data reading becomes longer, and thus continuity of image reproduction is lost.

Incidentally, according to the above-mentioned general multi-angle function, one angle can be selected from a plurality of angles and reproduction can be executed. However, in the multi-angle function, it is not possible to make images from a plurality of angles synchronize with each other so that the images of these angles are simultaneously reproduced. The reason for this is as follows.

As mentioned above, since it is required to realize the seamless reproduction, the upper limit of the size in the interleaved units is limited. However, an amount of image data included in each interleaved unit is not uniform. This is because as a compressing method which is used for recording image data onto DVD, a variable rate compressing method where a compressing rate varies with image quality or the like is adopted. More specifically, as the compressing method which is used for recording image data onto DVD, a variable rate compressing method utilizing MPEG2 is adopted. Therefore, a data amount in each angle does not become uniform, and as a result an amount of image data included in each interleaved unit does not become uniform.

Furthermore, reading timing or writing timing of image data stored in a buffer memory generally changes depending on an amount of data stored in the buffer memory. When an amount of the image data included in each interleaved unit is not uniform, the reading timing or the writing timing cannot be determined periodically.

Since an amount of the image data included in each interleaved unit is not uniform, or the reading timing or the writing timing of the image data stored in the buffer memory is not uniform, it is difficult, in the general multi-angle function, that a plurality of angles are synchronized with each other and images from these angles are reproduced simultaneously.

SUMMARY OF THE INVENTION

It is an object of the present invention to provide an image data reproducing method, an image data reproducing apparatus, an image data recording method and an image data recording apparatus, which are capable of synchronizing a plurality of image data with each other and reproducing them simultaneously.

An image reproducing method in accordance with the present invention is a method of reproducing at least first images and second images simultaneously, synchronizing the first images with the second images, the method has the processes of: reading first image data which is compressed data representing the first images and second image data which is compressed data representing the second images from a recording medium; storing the first image data read from the recording medium into a first memory device and storing the second image data read from the recording medium into a second memory device; and separately and simultaneously decoding the first image data stored in the first memory device and the second image data stored in the second memory device by using a first decoding device for decoding the first image data and a second decoding device for decoding the second image data.

In this method according to the present invention, each of the first image data and the second image data is divided into a plurality of data units on the recording medium. Each data unit has an equal time length and an equal data size. Each of the data units of the first image data and each of the data units of the second image data are alternately arranged on the recording medium. The data units are sequentially read from the recording medium in an order of an arrangement of the data units recorded on the recording medium, whereby the data unit of the first image data and the data unit of the second image data are alternatively read from the recording medium. As a result, the process of storing the first image data and the process of storing the second image data are alternately carried out for each of the data units.

Since each data unit has an equal data size, the process of storing the first image data and the process of the storing second image data are switched over to each other at equal time intervals. As a result, both the amount of the stored first image data in the first memory device and the amount of the stored second image data in the second memory device are changed in the same manner.

The decoding process for the first image data and the decoding process for the second image data are separately and simultaneously carried out at the same decoding rate in a parallel manner. When carrying out the decoding processes, the first image data is transmitted to the first decoding device from the first memory device, and the second image data is transmitted to the second decoding device from the second memory device. Since the amount of the stored first image data in the first memory device and the amount of the stored second image data in the second memory device are changed in the same manner, the timing of transmitting the first image data from the first memory device to the first decoding device and the timing of transmitting the second image data from the second memory device to the second decoding device can be easily controlled, so that the decoding processes can be easily synchronized with each other. Furthermore, each data unit has an equal time length. This means that the reproduction time of the image data contained in each data unit is uniform. Accordingly, the reproduction of the first images and the reproduction of the second imaged can be easily synchronized.

In the image reproducing method stated above, the first image data and the second image data may be recorded on the recording medium in accordance with a DVD standard, and each of the plurality of data units may include one or a plurality of video object units (VOBUs). The VOBU is a minimum unit in the reproducing process of the DVD reproducing apparatus. If each of the plurality of data units includes one or a plurality of VOBUs, it is easy for the DVD reproducing apparatus to handle the data units by using a DVD reproduction technique.

In the image reproducing method stated above, the first image data and the second image data may be generated by converting variable rate compressed data compressed by using an MPEG (Moving Picture Expert Group) compression method into fixed rate compressed data. By converting a variable rate into a fixed rate, the data size of each data unit can be uniform.

In the image reproducing method stated above, a plurality of data sets each comprising one of the data units of the first image data and one of the data units of the second image data that is located next to the one of the data units of the first image data on the recording medium may include audio data, respectively, and the audio data may be decoded in a way that a reproduction of the audio data is synchronized with a reproduction of the first images and a reproduction of the second images. Thus, the synchronization of the first images, the second images and sounds can be efficiently achieved.

In the image reproducing method stated above, each data set may include synchronization data, and the process of decoding the first image data and the second image data may be carried out by using the synchronization data so as to synchronize a reproduction of the first images with a reproduction of the second images. By using the synchronization data, the synchronization of the first images and the second images can be easily achieved.

To the image reproducing method stated above, the process of monitoring an amount of the first image data stored in the first memory device and an amount of the second image data stored in the second memory device may be added. By this monitoring process, it is possible to prevent overflow or underflow in the first memory device and overflow or underflow in the second memory device.

An image reproducing apparatus in accordance with the present invention is an apparatus for reproducing at least first images and second images simultaneously, synchronizing the first images with the second images, the apparatus has: a reading device for reading first image data which is compressed data representing the first images and second image data which is compressed data representing the second images from a recording medium; a first memory device for storing the first image data read from the recording medium; a second memory device for storing the second image data read from the recording medium; a first decoding device for decoding the first image data stored in the first memory device; and a second decoding device for decoding the second image data stored in the second memory device. In this apparatus, each of the first image data and the second image data is divided into a plurality of data units each having an equal time length and an equal data size, and each of the data units of the first image data and each of the data units of the second image data are alternately arranged on the recording medium. The reading device sequentially reads the data units from the recording medium in an order of an arrangement of the data units recorded on the recording medium. An operation of storing the first image data into the first memory device and an operation of storing the second image data into the second memory device are alternately carried out for each of the data units. The first decoding device and the second decoding device separately and simultaneously decodes the first image data and the second image data at a same decoding rate.

Each data unit of the first image data and each data unit of the second image data are alternately arranged on the recording medium. The reading device sequentially reads data units from the recording medium in an order of the arrangement of the data units recorded on the recording medium. Therefore, the data unit of the first image data and the data unit of the second image data are alternatively read from the recording medium. As a result, the operation of storing the first image data into the first memory device and the operation of storing the second image data into the second memory device are alternately carried out for each of the data units.

Since each data unit has an equal data size, the operation of storing the first image data and the operation of the storing second image data are switched over to each other at equal time intervals. As a result, both the amount of the stored first image data in the first memory device and the amount of the stored second image data in the second memory device are changed in the same manner.

The first decoding device and the second decoding device separately and simultaneously decode the stored first image data and the stored second image data at the same decoding rate. When carrying out the decoding operations, the first image data is transmitted to the first decoding device from the first memory device, and the second image data is transmitted to the second decoding device from the second memory device. Since the amount of the stored first image data in the first memory device and the amount of the stored second image data in the second memory device are changed in the same manner, the timing of transmitting the first image data from the first memory device to the first decoding device and the timing of transmitting the second image data from the second memory device to the second decoding device can be easily controlled, so that the decoding operations can be easily synchronized with each other. Furthermore, each data unit has an equal time length. This means that the reproduction time of the image data contained in each data unit is uniform. Accordingly, the reproduction of the first images and the reproduction of the second imaged can be easily synchronized.

In the image reproducing apparatus stated above, the first image data and the second image data may be recorded on the recording medium in accordance with a DVD standard, and each of the plurality of data units may include one or a plurality of video object units (VOBUs). The VOBU is a minimum unit in the reproducing process of the DVD reproducing apparatus. If each of the plurality of data units includes one or a plurality of VOBUs, it is easy for the DVD reproducing apparatus to handle the data units by using a DVD reproduction technique.

In the image reproducing apparatus, the first image data and the second image data may be generated by converting variable rate compressed data compressed by using an MPEG (Moving Picture Expert Group) compression method into fixed rate compressed data. By converting a variable rate into a fixed rate, the data size of each data unit can be uniform.

In the image reproducing apparatus, a plurality of data sets each comprising one of the data units of the first image data and one of the data units of the second image data that is located next to the one of the data units of the first image data on the recording medium may include audio data respectively, and the audio data may be decoded in such a way that a reproduction of the audio data is synchronized with a reproduction of the first images and a reproduction of the second images. Thus, the synchronization of the first images, the second images and sounds can be efficiently achieved.

In the image reproducing apparatus, a plurality of data sets each comprising one of the data units of the first image data and one of the data units of the second image data that is located next to the one of the data units of the first image data on the recording medium may include synchronization data respectively, and the first decoding device and the second decoding device may decode the first image data and the second image data by using the synchronization data so as to synchronize a reproduction of the first images with a reproduction of the second images. By using the synchronization data, the synchronization of the first images and the second images can be easily achieved.

A monitoring device for monitoring an amount of the first image data stored in the first memory device and an amount of the second image data stored in the second memory device may be added to the image reproducing apparatus stated above, in order to prevent overflow or underflow in the first memory device and overflow or underflow in the second memory device. By this monitoring device, it is possible to prevent overflow or underflow in the first memory device and overflow or underflow in the second memory device.

An image recording method in accordance with the present invention is a method of recording at least first image data which is compressed data representing first images and the second image data which is compressed data representing second images onto a recording medium. The method includes the processes of: dividing each of the first image data and the second image data into a plurality of data units each having an equal time length and an equal data size; generating a data stream in which the data units of the first image data are arranged in a reproduction order, in which the data units of the second image data are arranged in a reproduction order, and in which each of the data units of the first image data and each of the data units of the second image data are alternately arranged; and recording the data stream onto the recording medium. By using this recording method, the data stream appropriate for a simultaneous and synchronized reproduction of the first images and the second images can be recorded onto the recording medium.

In the image recording method stated above, the data stream may be generated in accordance with a DVD standard, and each of the plurality of data units may include one or a plurality of video object units (VOBUs).

In the image recording method stated above, the first image data and the second image data may be generated by converting variable rate compressed data compressed by using an MPEG (Moving Picture Expert Group) compression method into fixed rate compressed data. By converting a variable rate into a fixed rate, the data size of each data unit can be uniform.

In the image recording method stated above, a plurality of data sets each comprising one of the data units of the first image data and one of the data units of the second image data that is located next to the one of the data units of the first image data are formed in the data stream, and audio data may be added to each of the plurality of data sets in the process of generating the data stream. By using this recording method, the data stream appropriate for a simultaneous and synchronized reproduction of the first images, the second images, and sounds can be recorded onto the recording medium.

In the image recording method stated above, a plurality of data sets each comprising one of the data units of the first image data and one of the data units of the second image data that is located next to the one of the data units of the first image data are formed in the data stream, and synchronization data may be added to each of the plurality of data sets in the process of generating the data stream. By adding the synchronization data, the synchronization of the first images and the second images can be easily established, when the first image data and the second image data recorded on the recording medium are reproduced.

An image recording apparatus in accordance with the present invention is an apparatus for recording at least first image data which is compressed data representing first images and the second image data which is compressed data representing second images onto a recording medium. The apparatus has: a dividing device for dividing each of the first image data and the second image data into a plurality of data units each having an equal time length and an equal data size; a generating device for generating a data stream in which the data units of the first image data are arranged in a reproduction order, in which the data units of the second image data are arranged in a reproduction order, and in which each of the data units of the first image data and each of the data units of the second image data are alternately arranged; and a recording device for recording the data stream onto the recording medium. By using this recording apparatus, the data stream appropriate for a simultaneous and synchronized reproduction of the first images and the second images can be recorded onto the recording medium.

In the image recording apparatus stated above, the data stream may be generated in accordance with a DVD standard, and each of the plurality of data units includes one or a plurality of video object units (VOBUs).

In the image recording apparatus stated above, the first image data and the second image data may be generated by converting variable rate compressed data compressed by using an MPEG (Moving Picture Expert Group) compression method into fixed rate compressed data. By converting a variable rate into a fixed rate, the data size of each data unit can be uniform.

In the image recording apparatus stated above, a plurality of data sets each comprising one of the data units of the first image data and one of the data units of the second image data that is located next to the one of the data units of the first image data are formed in the data stream, and the generating device may add audio data to each of the plurality of data sets. By using this recording apparatus, the data stream appropriate for a simultaneous and synchronized reproduction of the first images, the second images, and sounds can be recorded onto the recording medium.

In the image recording apparatus stated above, a plurality of data sets each comprising one of the data units of the first image data and one of the data units of the second image data that is located next to the one of the data units of the first image data are formed in the data stream, and the generating device may add synchronization data to each of the plurality of data sets. By adding the synchronization data, the synchronization of the first images and the second images can be easily established, when the first image data and the second image data recorded on the recording medium are reproduced.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 10 is a diagram showing an example of an image reproduced by the synchronized multi-angle process according to the embodiment of the present invention; and FIGS. 11A through 11D are diagrams showing layout examples of a screen where an image reproduced by the synchronized multi-angle process is displayed according to the embodiment of the present invention.

DETAILED DESCRIPTION OF THE PREFERRED EMBODIMENTS

There will be described below preferred embodiment of the present invention with reference to the diagrams. Here, in the following embodiment, a function for synchronizing a plurality of image data and reproducing them simultaneously is named "synchronized multi-angle function".

Figure 1:
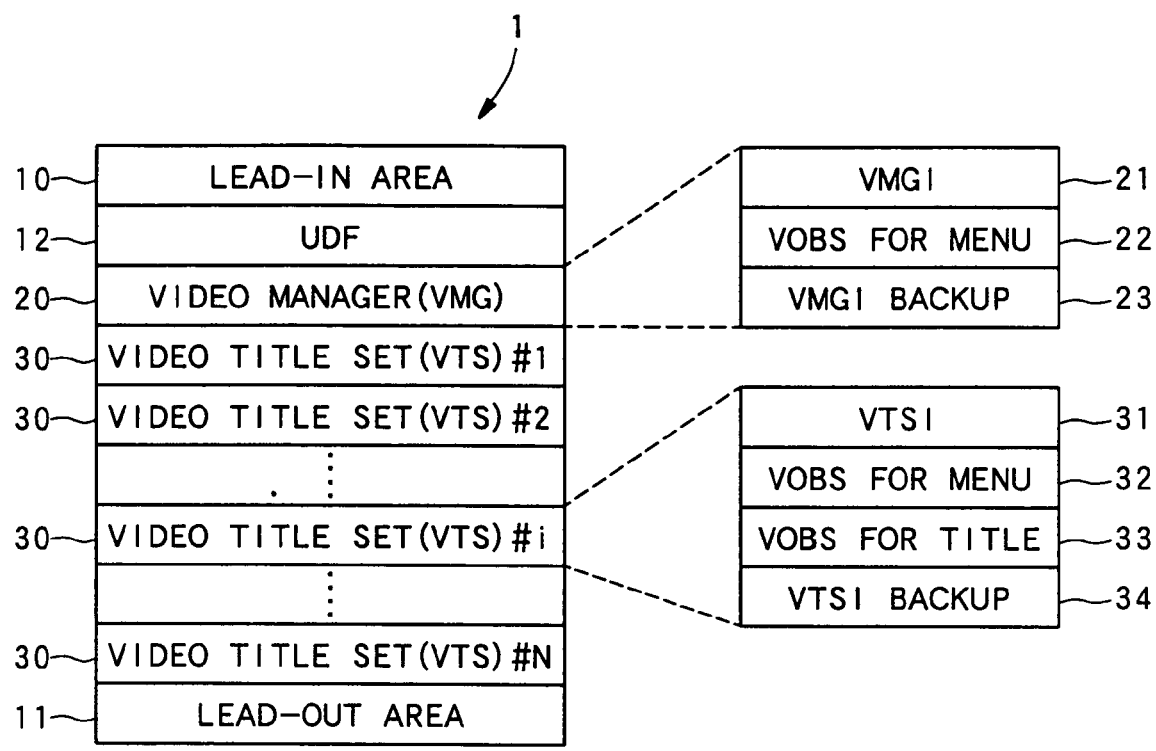
FIG. 1 is a diagram showing a logical format of DVD.

In the present embodiment, DVD is used as a recording medium for recording image data thereonto. FIG. 1 shows a logical format of the DVD. As shown in FIG. 1, an area in DVD, which is sandwiched between a lead-in area 10 on an innermost portion and a lead-out area 11 on an outermost portion, is a data recording area. A UDF (Universal Disk Format) 12 where information for managing the logical format is described is recorded onto a head of the data recording area. Then, one video manager (VMG) 20 and a plurality of video title sets (VTS) 30 are recorded as logical units for composing contents. A number of the VTS 30 is limited within a range of 1 to 99, for example.

Descriptors, which correspond to a micro UDF as sub-set of IS09660 and IS013346 which are the logical formats applied to CD-ROM, are recorded onto the UDF 12. A producer can write various data freely onto the UDF 12. In the present embodiment, identification information, which represents that reproduction from the DVD 1 can be executed by a simultaneous multi-angle function, is recorded onto the UDF 12.

Data for controlling all the data to be recorded onto the DVD 1 are recorded onto the VMG 20. For example, a system menu and opening message for selecting a title are included in the VMG 20. As shown in FIG. 1, the VMG 20 is composed of a video manager information (VMGI) 21 as control data, a menu-use video object set (VOBS) 22 and a back up 23 of the VMGI 21.

In addition, in FIG. 1, a total N-numbered of VTSs 30 #1 through #N are arranged. The VTS 30 corresponding to an arbitrary #i in #1 through #N VTSs 30 is composed of video title set information (VTSI) 31 as control data for the VTS 30, a menu-use video object set (VOBS) 32, a title-use VOBS 33 and a back up 34 of the VTSI 31.

Figure 2:
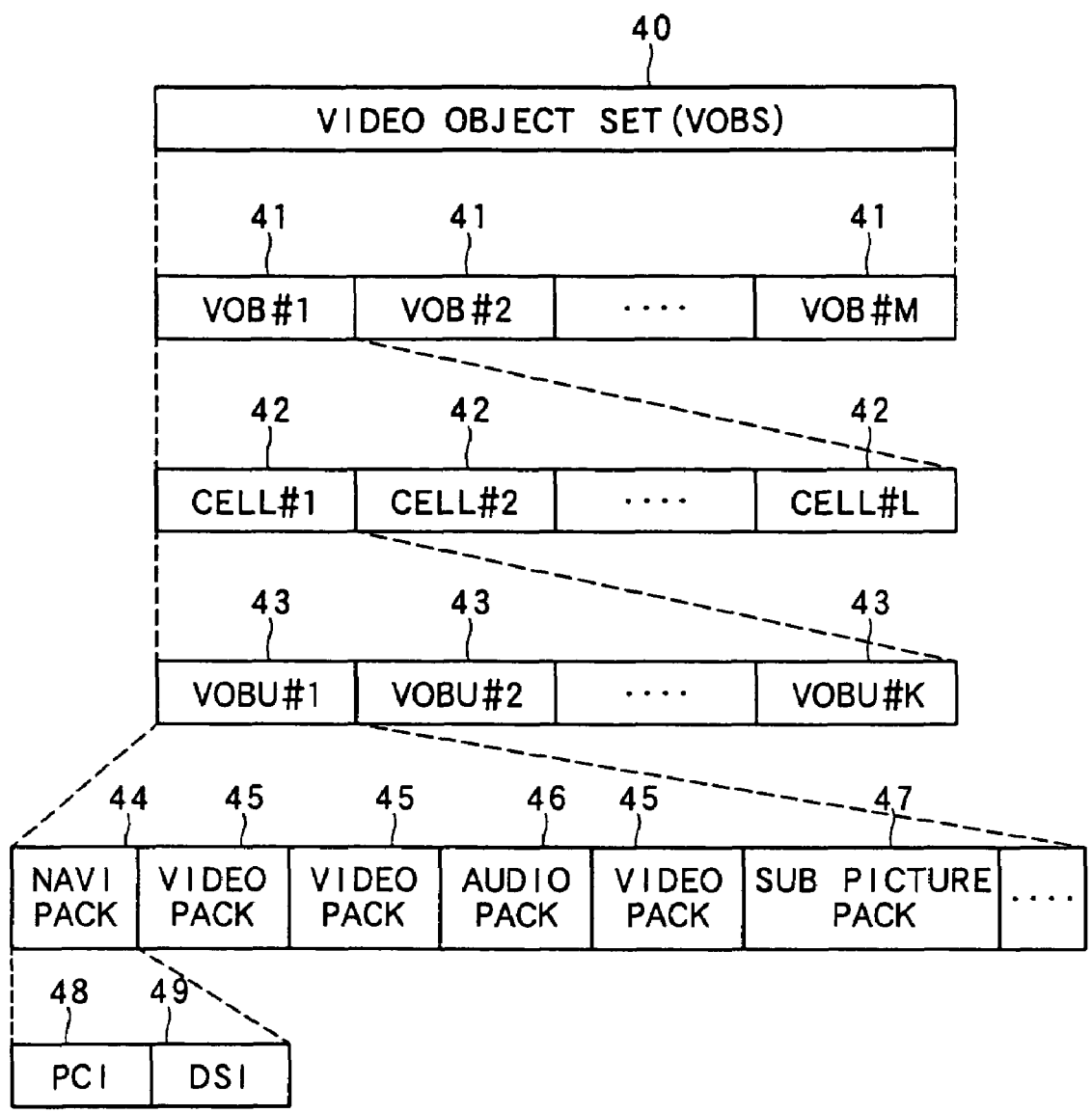
FIG. 2 is a diagram showing a structure of a video object set in the logical format of DVD.

FIG. 2 shows a data structure of the VOBS. The menu-use VOBS 32 and the title-use VOBS 33 have the data structure same as that of VOBU 40 shown in FIG. 2.

The VOBS 40 is composed by collecting one or plural video objects (VOB) 41. Identification numbers (#1 through #M) are given to each VOB 41. As a result, one of #1 through #M VOBs 41 can be specified.

In addition, the VOB 41 is composed of one or plural cells 42. The cell 42 is a basic unit for reproducing a title, and an order of reproducing the cells 42 is specified so that an arbitrary program can be composed. Identification numbers (#1 through #L) are given to the respective cells 42. As a result, one of the #1 through #L cells 42 can be specified.

In addition, the cell 42 is composed of one or plural video object units (VOBU) 43. FIG. 2 shows the case where the cell 42 includes K-numbered VOBUs 43 #1 through #K. The VOBU 43 is a minimum unit for accessing the DVD 1 at the time of reproduction, and it normally has a reproducing time length within a range of 0.4 sec. to 1.2 sec.

Each VOBU 43 is defined as a string of a pack whose head is a navigation pack (navi pack) 44. After the navigation pack 44, a video pack 45, an audio pack 46 and a sub-picture pack 47 are arranged according to predetermined order. Namely, the VOBU 43 is a set composed of all the packs from a certain navigation pack 44 to pack just before the next navigation pack 44 which are recorded.

The navigation pack 44 is composed of two packets, PCI (Presentation Control Information) 48 and DSI (Data Search Information) 49. Navigation data for controlling reproduction of an image or sound are written onto the PCI 48. Navigation data for executing search for VOBU 43 are written onto the DSI 49.

The video pack 45 includes one or plural group-of-picture (GOP). The GOP is a unit determined by the MPEG2 format. Moreover, audio data as sound information attached to video information are recorded onto the audio pack 46. As the audio data, systems such as linear PCM, AC3, MPEG audio can be used. Further, sub-picture data such as characters and graphic to be displayed as a sub-image are recorded onto the sub-picture pack 47.

Figure 3:
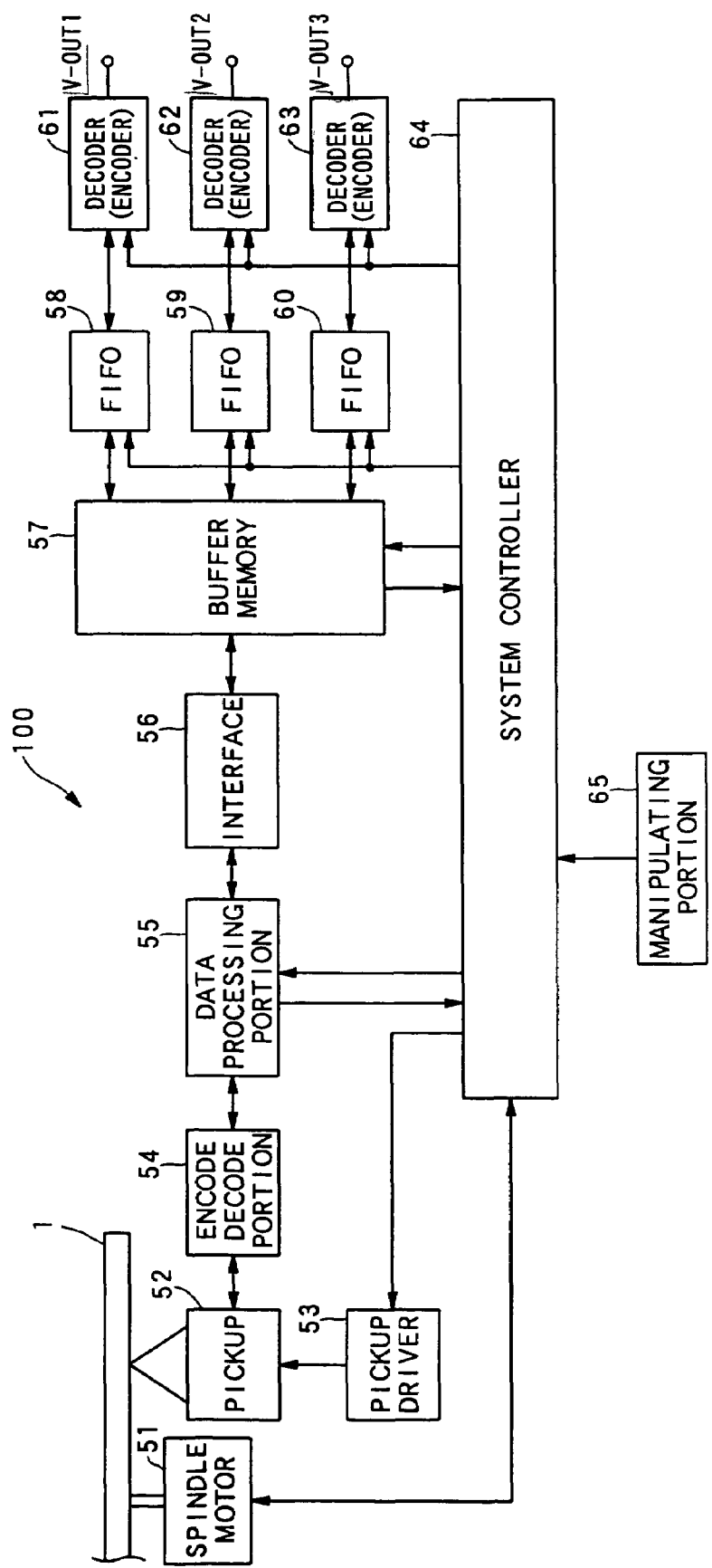
FIG. 3 is a diagram showing a structure of an information recording/reproducing apparatus according to an embodiment of the present invention.

FIG. 3 shows a structure of an information recording/reproducing apparatus according to the embodiment of the present invention. An information recording/reproducing apparatus 100 shown in FIG. 3 reads and writes image data from/into the DVD 1. Further, the information recording/reproducing apparatus 100 according to the embodiment has the synchronized multi-angle function for synchronizing three sorts of images imaged from three angles and simultaneously reproducing them. Further, in order to realize the synchronized multi-angle function by means of the information recording/reproducing apparatus 100, three sorts of image data imaged from three angles are recorded onto the DVD 1.

In FIG. 3, the information recording/reproducing apparatus 100 has a spindle motor 51, a pickup 52, a pickup driver 53, an encoding/decoding portion 54, a data processing portion 55, an interface 56, a buffer memory 57, a first FIFO memory 58, a second FIFO memory 59, a third FIFO memory 60, a first decoder 61, a second decoder 62, a third decoder 63, a system controller 64 and a manipulating portion 65.

The whole operation of the information recording/reproducing apparatus 100 is controlled by the system controller 64. The system controller 64 controls the whole apparatus according to a control program stored in memory means, not shown. Then, the system controller 64 transmits a control signal to the spindle motor 51, the pickup driver 53, the data processing portion 55, the first decoder 61, the second decoder 62 and the third decoder 63 so as to control their operations as well as controls timing of data transmission to the buffer memory 57, the first FIFO memory 58, the second FIFO memory 59 and the third FIFO memory 60.

The DVD 1 is rotated by the spindle motor 51 under the control by the system controller 64 so that its linear velocity is kept constant. The pickup 52 emits a light beam onto a recording track on the DVD 1 via an optical system which is not shown, and receives a reflected beam. The pickup 52 is driven by the pickup driver 53 according to the control by the system controller 64. As a result, a suitable laser power and tracking are kept.

A detecting signal output from the pickup 52 is input into the encoding/decoding portion 54 so as to be subject to a decoding process, and the decoded signal is input into the data processing portion 55 so as to be subject to a necessary process such as error correction. As a result, data according to the logical format can be obtained. The data are stored in the buffer memory 57 via the interface 56.

Since the data stored in the buffer memory 57 are divided per angle, they are separated into a data unit, mentioned later, by the system controller 64 at predetermined timing. Then, each of the separated data units is output to the first FIFO memory 58, the second FIFO memory 59 and the third FIFO memory 60 under the control by the system controller 64.

Figure 4:
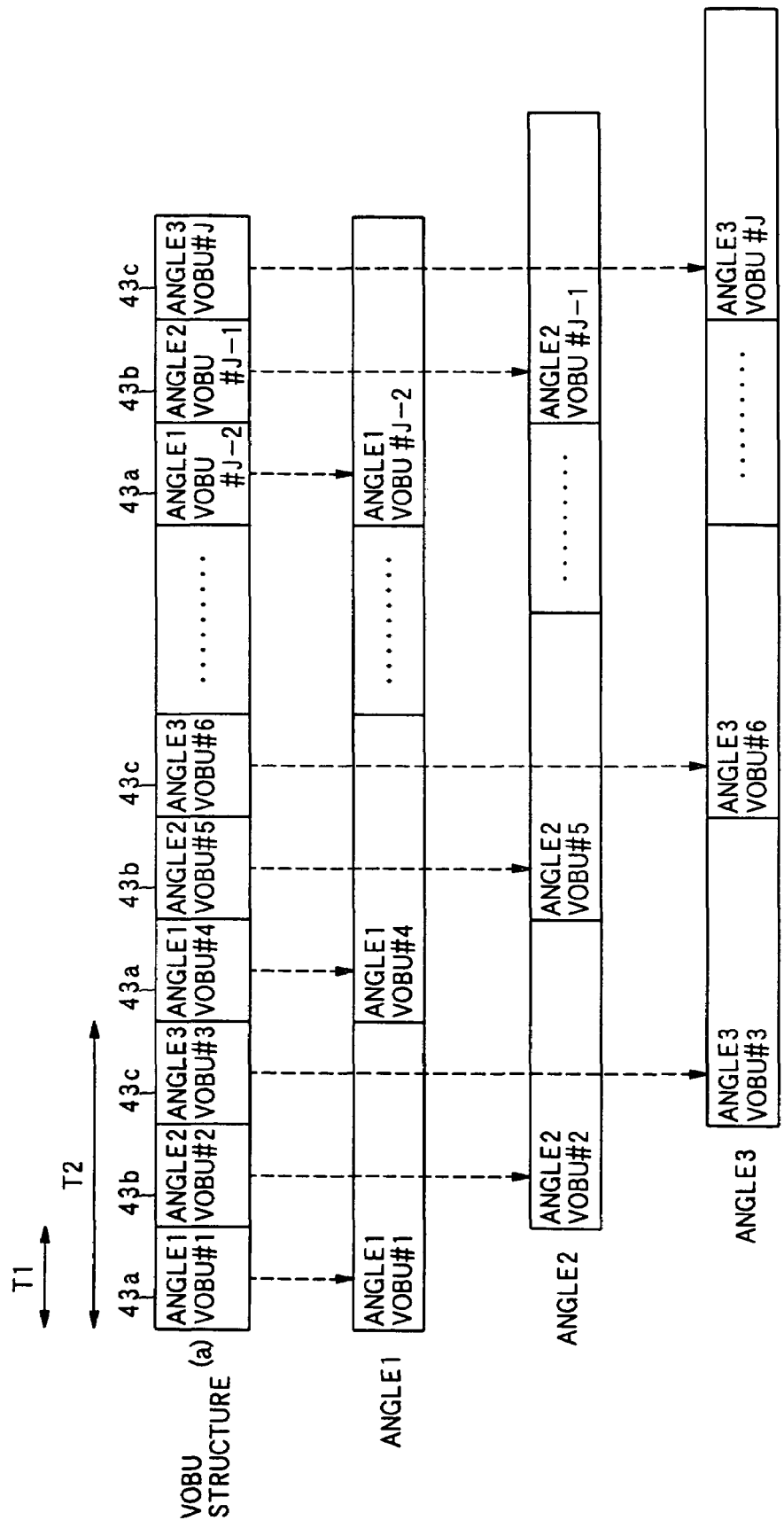
FIG. 4 is a diagram showing a synchronized multi-angle process according to the embodiment of the present invention.

In FIG. 4, a data string represented by a code (a) shows a string of VOBUs recorded onto the DVD 1. The VOBU string is an example in the case where image data imaged from three angles are recorded onto the DVD 1. As shown in FIG. 4, the VOBU string includes three sorts of VOBUs corresponding to the three angles. VOBU 43a corresponds to the angle 1. VOBU 43b corresponds to the angle 2. VOBU 43c corresponds to the angle 3. Namely, the image data imaged from the angle 1 are recorded onto the VOBU 43a. The image data imaged from the angle 2 are recorded onto the VOBU 43b. The image data imaged from the angle 3 are recorded onto the VOBU 43c.

Further, in the VOBU string, the VOBUs 43a, 43b and 43c are arranged in this order, and this arrangement is repeated. Each of the VOBUs 43a, 43b and 43c are the above-mentioned data units. Here, in the VOBU string represented by the code (a) in FIG. 4, one VOBU composes one data unit, but the present invention is not limited to this, and thus a plurality of VOBUs may compose one data unit.

The pickup 52 reads the VOBUs 43a through 43c recorded onto the DVD 1 in this order. The read VOBUs 43a through 43c are stored in the buffer memory 57 in this order. The VOBU 43a stored in the buffer memory 57 is transmitted to the first FIFO memory 58, and the VOBU 43b stored in the buffer memory 57 is transmitted to the second FIFO memory 59 and the VOBU 43c stored in the buffer memory 57 is transmitted to the third FIFO memory 60. In such a manner, the data recorded onto the DVD 1 are read successively so that the image data can be divided per angle. Since the VOBUs 43a through 43c are arranged repeatedly in this order on the DVD 1, the pickup 52 can read the VOBUs 43a through 43c without track jump. Since three sorts of image data whose angles are different can be read without track jump, the three sorts of the image data can be read smoothly, and thus the synchronized multi-angle reproduction can be executed seamlessly.

More specifically, the VOBUs 43a (#1, #4, #7, ...) from the angle 1 are transmitted to the first FIFO memory 58. The transmitted VOBUs 43a are subject to the decoding process one after another by the first decoder 61. As a result, the images from the angle 1 are reproduced continuously. The same procedure is applied to the angle 2 and the angle 3.

Here, reproducing time of images corresponding to the image data included in each data unit is the same as each other, and thus it is T2. In other words, the reproducing time of images corresponding to the image data included in the VOBUs 43a, 43b and 43c is all the same, and thus it is T2. Further, in the present embodiment, since the image data are compressed at a fixed rate, a size of the compressed image data (data amount) corresponding to the reproducing time T2 is the same. This means that the data sizes of the VOBU 43a, 43b and 43c are all the same.

On the other hand, as shown in FIG. 4, as for all the data units, the reading time of the data from the DVD 1 and transmission time from the buffer memory 57 to the FIFO memories 58 through 60 are T1. At this time, as for T1 and T2, if a relationship of T1×3≦T2 is not satisfied, the transmission of the data of three angles cannot be completed in time. FIG. 4 shows the case where T1×3=T2, and when T1 becomes longer, the images of all the angles cannot be reproduced simultaneously and seamlessly. Actually, the reading time may not coincide with the transmission time, and when the transmission time is T1, the reading time may be shorter than T1, but the case where both the reading time and the transmission time are T1 are shown for convenience.

For example, T2 is set as the reproducing time for 0.5 sec. Then, it is necessary to set T1 to not more than 0.15 sec. FIG. 4 shows the example of three angles, but when a number of angles increased, T1 should be shorter. When this is considered from the viewpoint of the rate, the reading rate of the DVD 1 should be at least three times as much as the rate of MPEG2. Since the rate of MPEG2 is converted into a fixed rate as mentioned later in the present invention, a data size cannot be much smaller in the view of the image quality. Therefore, in order to secure a number of angles, it is preferable that the reading rate of the DVD 1 is set larger, namely, to double speed, triple speed and the like.

Actually the reading timing, transmission timing and decode timing of the specified VOBUs 43a, 43b and 43c are delayed by a required processing time, but in FIG. 4, the delay is not shown for convenience.

As shown in FIG. 3, the data which were divided per angle as mentioned above, i.e., the video, audio and sub-picture data are subject to the decoding process. Namely, as for the angle 1, the data are output from the first FIFO memory 58 to the first decoder 61, and the video pack 45 is decoded according to MPEG2 so that the image signal is reproduced. Moreover, the audio pack 46 is decoded according to a predetermined method so that the audio signal is reproduced. Further, the sub-picture pack 47 is decoded so that the sub-image to be displayed upon reproduction is generated. As for the angle 2, the data are output from the second FIFO memory 59 to the second decoder 62 and the same process is executed. Moreover, as for the angle 3, the data are output from the third FIFO memory 60 to the third decoder 63 and the same process is executed.

In such a manner, since the data sizes of VOBUs 43a through 43c are the same as each other and the reproducing time of the images corresponding to the VOBUs 43a through 43c is the same, the three images corresponding to the three angles can be reproduced synchronously. As a result, an audience can enjoy the three images without a sense of incongruity.

Incidentally, the image data recorded onto the DVD1 according to the present embodiment are compressed by MPEG2. As mentioned above, MPEG2 normally adopts a variable-rate compressing method. Therefore, when the image data are compressed by using the variable-rate compressing method of MPEG2, even if the reproducing time of the data units from each angle is the same as each other, data sizes of the data units are different from each other.

Figure 5:
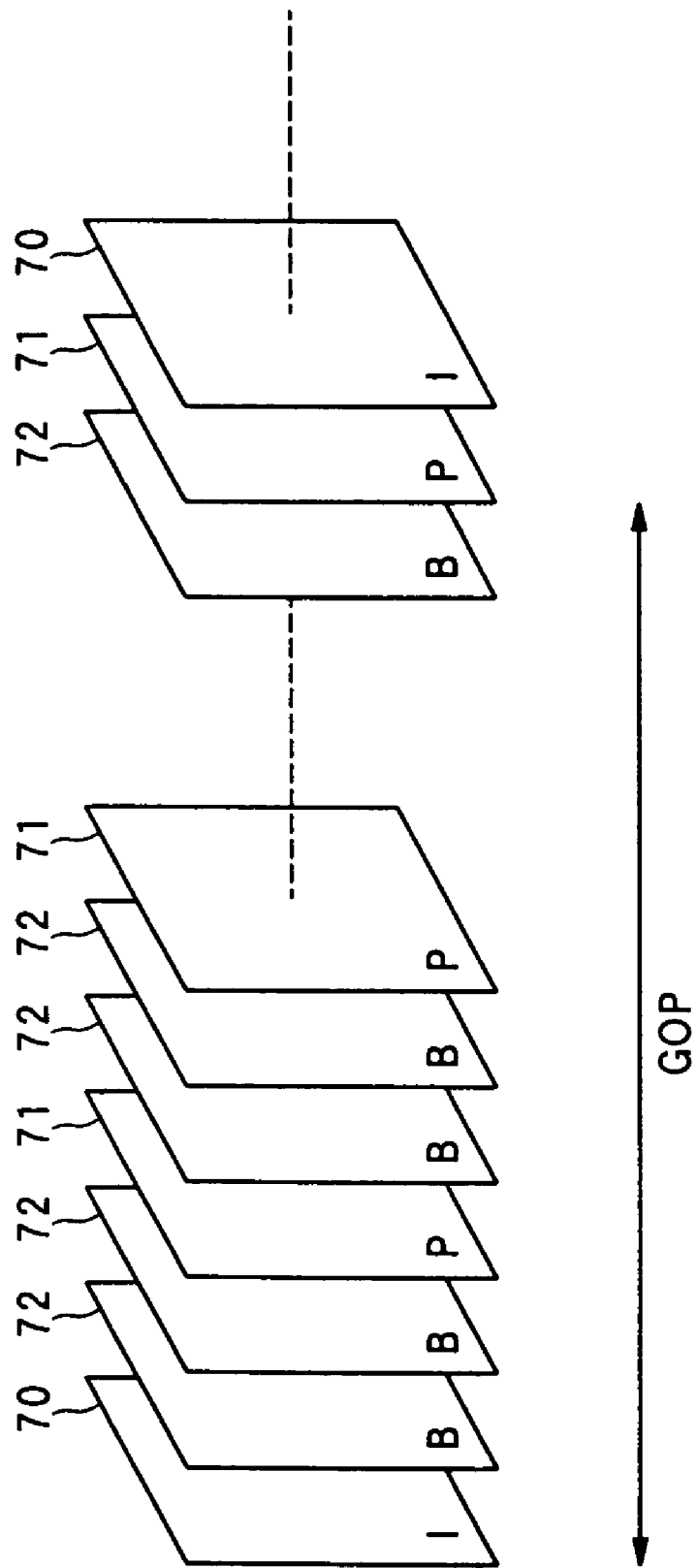
FIG. 5 is a diagram showing a structure of compressed data of MPEG2.

Here, the description will be given as to a structure of the compressed data by means of MPEG2 with reference to FIG. 5. As mentioned above, MPEG2 treats a plurality of frame data for each GOP unit. As shown in FIG. 5, the GOP is composed by three types of combinations of an I picture (Intra-coded Picture) 70, a P picture (Predictive-coded Picture) 71 and a B picture (Bidirectionally Predictive-coded Picture) 72.

In MPEG2, a high compression factor is achieved by motion compensative prediction for predicting a next image from a previous image, but the motion prediction is not used for the I picture 70, and as for the I picture 70, its image can be reproduced by itself. At least one I picture 70 is included in one GOP so that the data structure, which copes with special reproduction such as fast feed and rewind, is realized.

On the other hand, the P picture 71 and B picture 72 use the motion prediction, and the image data of the P picture 71 are reproduced only from past data and the image data of the B picture 72 are reproduced from past and future data by using the motion prediction.

Therefore, as for the image data encoded by MPEG2, the data size which is allocated to each picture changes depending on motion compensative efficiency and complexity of an original image. For example, in the case of a simple image such that movement of its original image is few, the data size becomes small, but in the case where the original image is complicated and moves frequently, the data size becomes large. For this reason, when the image data are created by MPEG2, the encoding process is executed on all the contents by using two passes, and a data amount corresponding to the average rate set at the second pass is allocated to each picture based on a tendency of the data change analyzed at the first pass.

In such a manner, when the image data are compressed (encoded) by MPEG2, the data size of the compressed image data normally changes depending on the motion compensative efficiency and complicacy of the original image. As a result, even if the time for reproducing images corresponding to respective data units is set uniformly, the data sizes of the respective data units do not become uniform.

In order to prevent such inconvenience, in the present embodiment, the data sizes of the respective data units are set uniformly by the following method.

Namely, it is a method in which a maximum data rate is set for the respective data units, and in the case where the data rate becomes smaller than the maximum data rate, dummy data are added. In other words, when a simple image portion whose movement is few is encoded and this portion does not obtain the maximum data rate, predetermined dummy data are written into this portion. At the time of reproduction, the dummy data are identified and are not used for the decoding process by means of MPEG2. In another way, the dummy data may be null data which are ignored at the time of the decoding process.

Image data are compressed and encoded so that a predetermined number of bits are obtained per type of pictures, per GOP or per VOBU 43, or dummy data or the like are extrapolated into the image data so that a predetermined number of bits are obtained, and the image data with fixed rate may be obtained. Namely, the image data are edited so that a fixed number of bits are obtained for each data unit of each angle.

Here, in order to satisfactorily maintain the quality of the image decoded by the MPEG2, the data rate cannot be too small, and thus the recording time is limited to a certain extent. In the case where the recording time takes precedence over the image quality, for example, it is considered that the maximum data rate is suppressed. However, in view of a form of a use, mentioned later, in the synchronized multi-angle according to the present embodiment, since it is not much necessary to lengthen the recording time, it is preferable that the image quality takes precedence over the recording time.

As a result of converting into the fixed rate provisionally in such a manner, the data sizes of the VOBU 43a corresponding to the angle 1, the VOBU 43b corresponding to the angle 2 and the VOBU 43c corresponding to the angle 3 can be uniform.

When the reproducing time of the images corresponding to the respective data units are set uniformly and the data sizes of the respective data units are set uniformly, the timing of reproducing the three image data imaged from three angles can be synchronized with each other. There will be described below the synchronizing process with reference to FIGS. 6 and 7.

Figure 6:
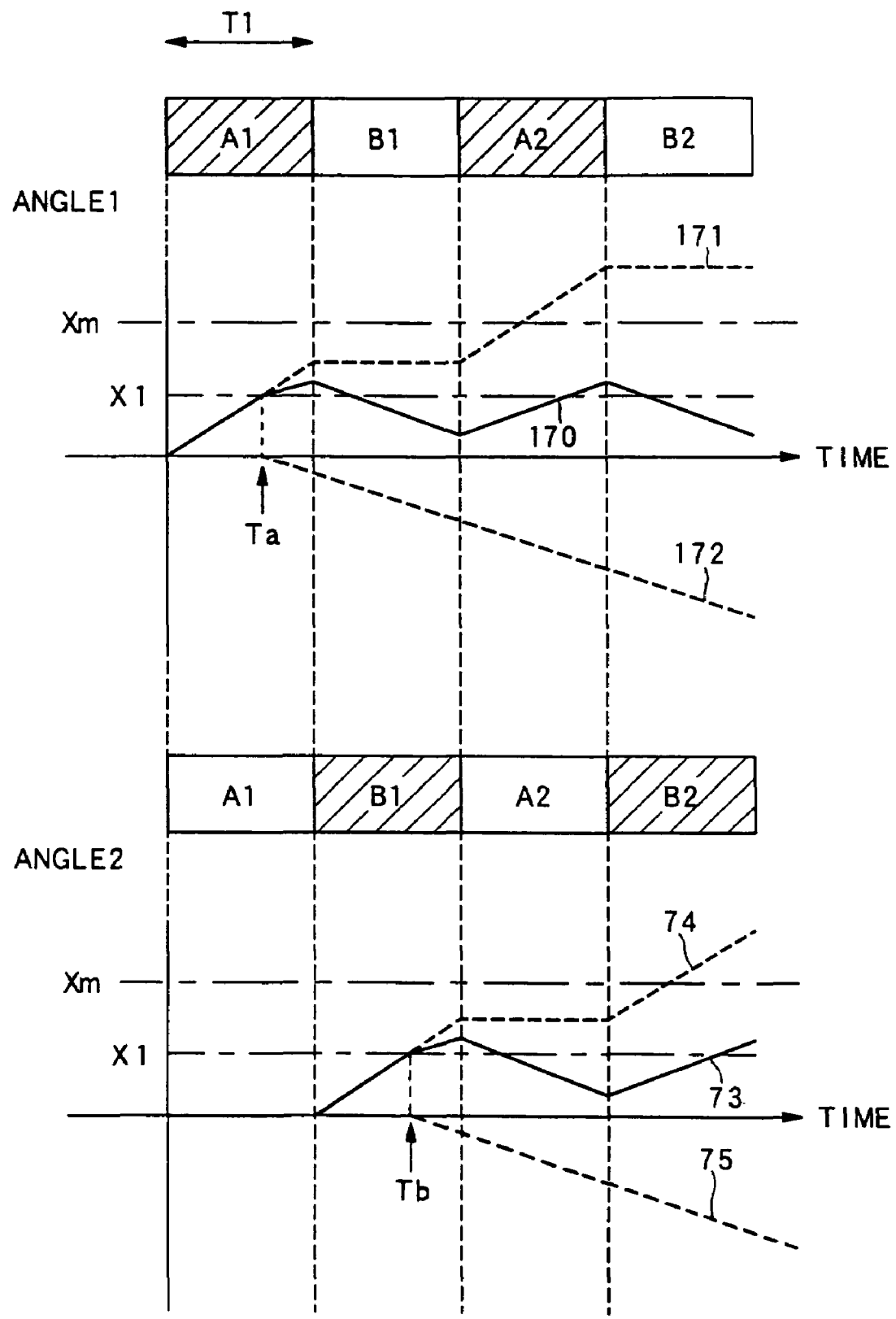
FIG. 6 is a diagram showing writing and reading for an FIFO memory in the information recording/reproducing apparatus according to the embodiment of the present invention.

FIG. 6 is a diagram for explaining a relationship between the writing timing and reading timing with respect to the 5 FIFO memories. FIG. 6 shows, for convenience, a change in a data amount in the FIFO memories 58 and 59 with time in the case where data from two angles are reproduced. In FIG. 6, a maximum capacity of the FIFO memories 58 and 60 is Xm. The system controller 64 always monitors so that an amount of data to be actually stored falls within the range of Xm. The system controller 64 controls timing that reading from the DVD 1 is stopped or requested, timing that transmission via the buffer memory 57 is stopped or requested, and timing that the decoding process in the decoders 61 and 62 is started based on the data amount. Here, a set data amount X1 in FIG. 6 is a reference data amount that the decoding process is started.

The data amount in the FIFO memories 58 and 59 is monitored and the above-mentioned control is made because since the reading rate of the DVD 1 is different from the decoding rate in the decoders 61 and 62, it is necessary for execution of the real-time process to convert the rates. Namely, the read data amount and written data amount are different from each other in the FIFO memories 58 and 59, and as a result, overflow or underflow of data occurs. In order to prevent an amount of data from being excessive or insufficient, the above-mentioned control is made according to a data amount.

More specifically, the reading operation of the DVD 1 may be controlled by switching the reading between ON and OFF according to a data amount. As a result, the timing of writing into the buffer memory 57 or timing of transmitting into the FIFO memories 58 and 59 can be also controlled. On the other hand, since the real-time decoding process should be executed, it should be always executed continuously. Therefore, only the reading timing from each of the FIFO memories 58 and 59 at the time of starting the decoding is controlled based on X1. The starting of the decoding process is waited until the data amount reaches X1 because even when the data transmission is interrupted temporarily, for example, due to malfunction of the DVD 1 or at the time of special reproduction, it is necessary to secure data to be used for reproduction for a fixed time.

In FIG. 6, the data from angle 1 are decoded by the first FIFO memory 58 and the first decoder 61 (upper portion in FIG. 6), and the data from angle 2 are decoded by the second FIFO memory 59 and the second decoder 62 (lower portion in FIG. 6). In the reproducing process in FIG. 6, the data from angle 1 and angle 2 are synchronized with each other so as to be subject to the process, but the data transmission from the buffer memory 57 to the FIFO memories 58 and 59 cannot be executed simultaneously. Therefore, the transmission of the data corresponding to angle 1 to the FIFO memory 58 and the transmission of the data corresponding to angle 2 to the FIFO memory 59 are executed alternatively. Here, in FIG. 6, the data corresponding to angle 1 are recorded onto the data units A1 and A2, and the data corresponding to angle 2 are recorded onto the data units B1 and B2. Moreover, the shaded data units mean that at that time data recorded in these data units are transmitted from the buffer memory 57 to the corresponding FIFO memories.

In FIG. 6, a solid line 170 represents an amount of data stored in the first FIFO memory 58. A dotted line 171 represents an amount of data input into the first FIFO memory 58, and its tilt is equal to the transmission rate. A dotted line 172 represents an amount of data output from the first FIFO memory 58, and its tilt is equal to the decoding rate. Further, a solid line 73 represents an amount of data stored in the second FIFO memory 59. A dotted line 74 represents an amount of data input into the second FIFO memory 59, and its tilt is equal to the transmission rate. A dotted line 75 represents an amount of data output from the second FIFO memory 59, and its tilt is equal to the decoding rate.

In FIG. 6, at first a data amount is zero in both the FIFO memories 58 and 59. When the transmission of the data recorded onto the data unit A1 is started, the data amount in the first FIFO memory 58 increases at a speed determined by the transmission rate. Meanwhile, since the transmission to the second FIFO memory 59 is not executed at this time, the data amount in the second FIFO memory 59 is still zero.

Then, the data amount in the FIFO memory 58 reaches X1 at timing Ta. As a result, the data are started to be output to the first decoder 61, and the decoding process is started. Thereinafter, the data amount in the first FIFO memory 58 changes according to a difference between the transmission rate and decoding rate until the reading from the data unit A1 is completed. As shown in FIG. 6, since the transmission rate, namely, the reading rate from the DVD 1 is larger than the decoding rate, the data amount in the first FIFO memory 58 increases at a fixed rate.

In the present embodiment, since the data size of the data unit A1 is fixed and the transmission rate and setting value X1 can be preset, the timing Ta can be previously grasped as a fixed value.

Thereafter, the data recorded onto the data unit B1 are transmitted. As a result, a data amount in the second FIFO memory 59 increases at a speed determined by the transmission rate. On the other hand, since the transmission to the first FIFO memory 58 is not executed at this time and the decoding process in the first decoder 61 is continued, the data amount in the first FIFO memory 58 decreases at a speed determined by the decoding rate.

The data amount in the second FIFO memory 59 reaches X1 at timing Tb. As a result, data are started to be output to the second decoder 62, and the decoding process is started. Thereinafter, the data amount in the second FIFO memory 59 increases at fixed rate corresponding to a difference between the transmission rate and the decoding rate similarly to the first FIFO memory 58 until the reading of the data unit B1 is completed. Thereafter, while the decoding process is continued as to the angles 1 and 2 and the data amount in the FIFO memories 58 and 59 increases and decreases, the same process is repeated.

The timing Tb can be calculated by adding time widths corresponding to the data sizes of the respective data units to the timing Ta. Namely, a relationship of Tb=Ta+T1 is established with respect to a transmission period T1 of the data units as mentioned above. In order to realize this, the transmission rates of the data to the FIFO memories 58 and 59 are the same, and the set values X1 set in the FIFO memories 58 and 59 are the same.

As a result, a difference between the timing that the decoding of the image data corresponding to the angle 1 is started and the timing that the decoding of the image data corresponding to the angle 2 is started is always fixed, i.e., T1. Therefore, when the reproducing timing of the image corresponding to the angle 1 is delayed by T1 from the reproducing timing of the image corresponding to the angle 2, both the images can be synchronized easily. It is easy to delay the reproducing timing of the image corresponding to the angle 1 by T1. For example, the process on the angle 1 is delayed by the transmission period T1 so as to be executed, or a delay corresponding to the transmission period T1 may be considered previously when image data are created.

Figure 7:
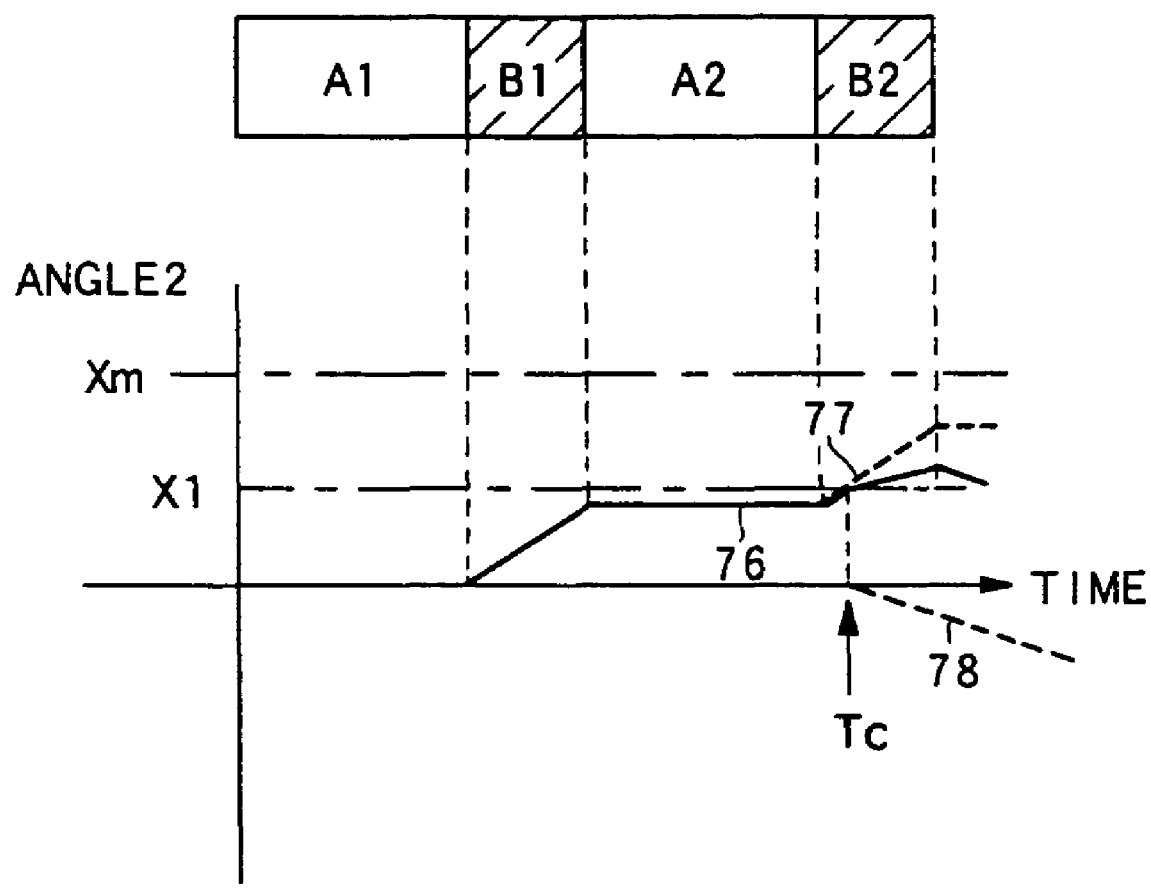
FIG. 7 is a diagram showing writing and reading for the FIFO memory when data sizes in data units are not uniform.

FIG. 7 is a diagram for explaining what kind of a trouble arises if the data sizes of the data units are not uniform. As one example, FIG. 7 shows the operation on the side of the angle 2 in the case where the data sizes of the data units of the angle 2 are smaller under the condition on the lower portion of FIG. 6. Here, the transmission rate, the decoding rate, the maximum capacity Xm and set value X1 of the second FIFO memory 59 are the same as those in FIG. 6. Moreover, in FIG. 7, the rate of the transmission from the buffer memory 57 to the second FIFO memory 59 is represented by a dotted line 77 (tilt) and the decoding rate when the data are output from the second FIFO memory 59 to the second decoder 62 is represented by a dotted line 78 (tilt). A transition in the data amount in the second FIFO memory 59 based on the transmission rate and the decoding rate is represented by a solid line 76.

Not shown in FIG. 7 though, the transmission of the data unit A1 on the side of the angle 1 is executed similarly to the case of FIG. 6. Namely, the timing Ta of FIG. 6 is applied also to the case of FIG. 7. On the other hand, when the transmission of the data unit B1 on the side of the angle 2 is started, the data amount in the second FIFO memory 59 increases for a while similarly to the lower portion of FIG. 6, but the transmission of the data unit B1 is ended before the data amount reaches X1. Therefore, at this stage, the decoding process on the side of the angle 2 is not started, and the transmission of the next data unit A2 to the first FIFO memory 58 is started.

Since during the transmission of the data unit A2, the transmission to the second FIFO memory 59 is not executed, the data amount is maintained, and after the transmission of the next data unit B2 is started, the data amount in the second FIFO memory 59 starts to increase again. Thereafter, the data amount in the second FIFO memory 59 reaches X1 at timing Tc, and the data are started to be output to the second decoder 62 so that the decoding process is started.

In such a manner, at the timing Tc in FIG. 7, the transmission of the second data unit B2 on the side of the angle 2 is started, and a relationship between the timing Ta and the timing Tc fluctuates according to the data sizes of the respective data units. For example, when MPEG2 is used in the state that the rate is not fixed and data are divided into data units at a variable rate, the data sizes of the data units change in accordance with a property of images, and thus the situation shown in FIG. 7 arises. Therefore, the data obtained by MPEG2 are recorded onto the DVD 1 according to the present embodiment with the rate being converted into a fixed rate so that the reproducing timing becomes uniform.

As shown in FIG. 3 again, in the information recording/reproducing apparatus of the present embodiment, reproduction can be executed not only from a DVD which copes with the synchronized multi-angle process of the present invention but also from a normal DVD as the DVD 1. In this case, only one system of the respective three FIFO memories 58 through 60 and the respective three decoders 61 through 63 may be operated. For example, only the first FIFO memory 58 and the first decoder 61 are operated so that data may be transmitted from the buffer memory 57 to the first FIFO memory 58.

The above embodiment described the case where a number of angles is three, but the present invention is not limited to this, and thus a number of angles can be set freely. As mentioned above, a number of angles is determined by a relationship between the reading rate of the DVD 1 and the decoding rate at the time of the decoding process. For example, since the standard maximum reading rate of the DVD 1 is 10.08 Mbps, it is necessary to set a total decoding rate of each angle to be smaller than 10.08 Mbps at the standard speed. For example, when the decoding rate is fixed to 5 Mbps, a number of angles should be about two. On the other hand, when the reading rate of the DVD 1 is doubled and tripled, the decoding rate or a number of angles can be increased.

For example, in the case where reading is executed from the DVD 1 at a double speed, the decoding rate can be 10 Mbps and a number of angles can be 2, or the decoding rate can be 6 Mbps and a number of angles can be 3. Moreover, in the case where the reading is executed from the DVD 1 at a triple speed, the decoding rate can be 10 Mpbs and a number of angles can be 3, or the decoding rate can be 6 Mpbs and a number of angles can be 5. Normally, when the image equality takes precedence over the recording time, the decoding rate may be set larger, and when the image quality is not required, a number of angles may be set larger. The reading rate of the DVD 1 is expected to be improved in the future, and it is possible to set both the decoding rate and a number of angles larger as the reading rate is improved.

Next, the information recording/reproducing apparatus 100 of the present embodiment can record image data onto the DVD 1. In this case, the hardware structure of FIG. 3 is used and the flow of the data is reversed. There will be described below the case where the recording operation is performed on the DVD 1 which copes with the synchronized multi-angle reproduction of the present invention.

Namely, in FIG. 3, the first decoder 61, the second decoder 62 and the third decoder 63 serve also as encoders. At first, image data corresponding to three angles are input from an image source, not shown, into the first decoder 61, the second decoder 62 and the third decoder 63. These image data are compressed and encoded by the MPEG2 system and their rate is converted into a fixed rate. After the image data are temporarily stored in the FIFO memories 58 through 60 under the control by the system controller 64, they are transmitted to the buffer memory 57 per VOBU 43, for example, so that the data structure of the present invention described in FIG. 4 is formed. The image data, which are obtained by combining the image data corresponding to the three angles, are input into the data processing portion 55 via the interface 56 and are subject to a necessary process, for example, adding an error correcting code. Thereafter, the image data are input into the encoding/decoding portion 54 so as to be subject to the encoding process. A recording power of the pick-up 52 is changed according to the encoding signal, and a light beam is emitted to a recording track on the DVD 1 so that the image data are finally recorded thereon.

Here, the DVD 1, which copes with the synchronized multi-angle reproduction of the present invention and where a plurality of image data are recorded, is created as DVD-ROM. Namely, as mentioned above, the basic specification follows the DVD video format, but the portion which copes with the synchronized multi-angle reproduction has a different specification. For this reason, the reproduction cannot be executed in a reproducing apparatus which copes with the normal DVD video format. Therefore, the DVD 1 is created as a DVD-ROM where a free degree of the recording data format is larger. As a result, an information reproducing apparatus having the structure same as that of the present embodiment is used so that the synchronized multi-angle reproduction can be executed.

There will be described below the process which is executed by the information recording/reproducing apparatus 100 of the present embodiment with reference to the flow chart in FIG. 8. The flow chart of FIG. 8 shows the process from insertion of DVD 1 to multi-angle reproduction.

Figure 8:
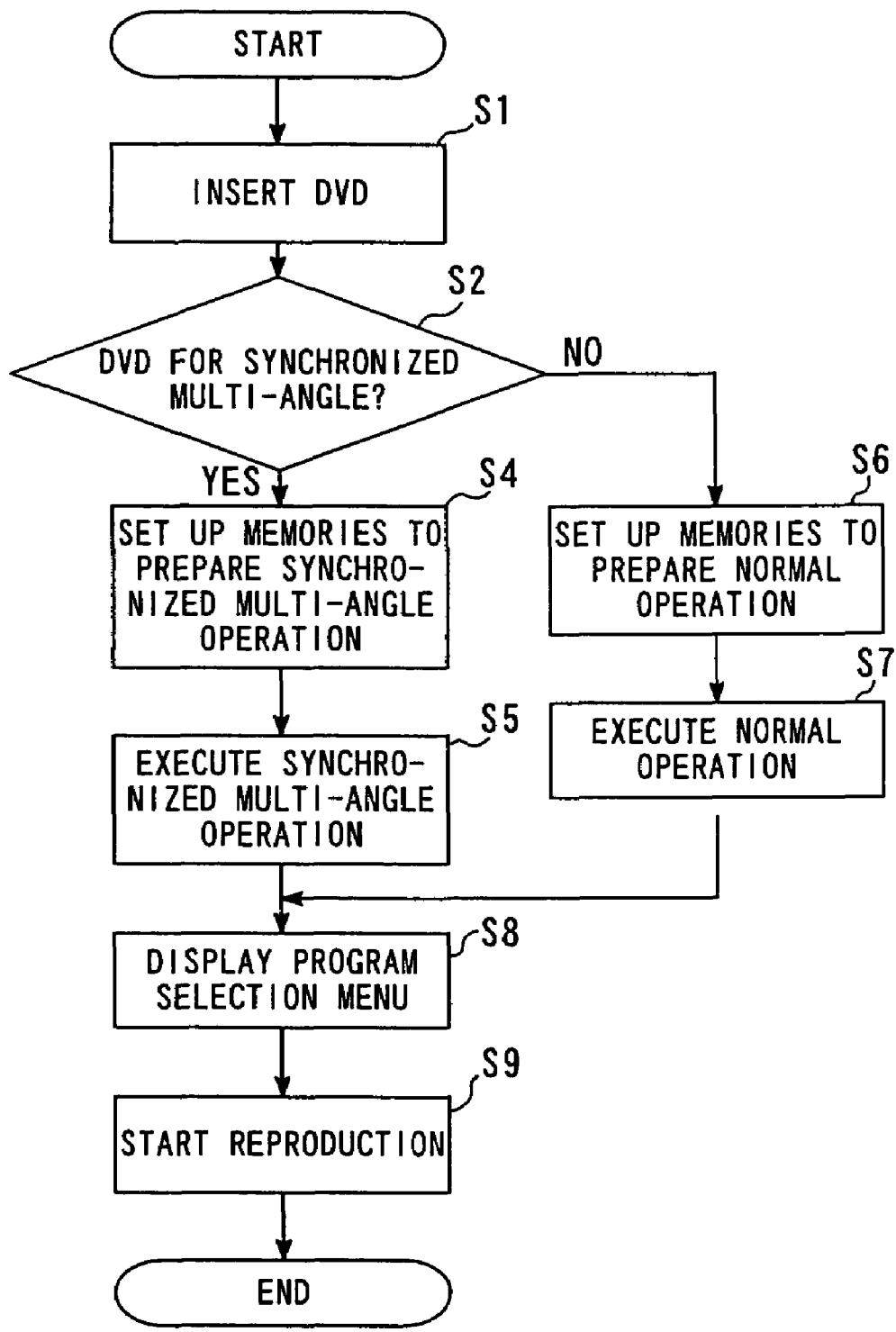
FIG. 8 is a flow chart showing a process which is executed by the information recording/reproducing apparatus according to the embodiment of the present invention.

In FIG. 8, when the DVD 1 is inserted into the information recording/reproduction apparatus 100 (step S1), the reading operation on the DVD 1 is started, and the identification information recorded onto the UDF 12 is read (step S2). In the DVD 1 which copes with the synchronized multi-angle reproduction of the present embodiment, since a predetermined code pattern is written as the identification information at the time of recording, a type of the DVD 1 can be determined by detecting the code pattern.

A determination is made (step S3) based on the identification information as to whether the DVD 1 inserted at S1 is a normal disk or a disk which copes with the synchronized multi-angle reproduction of the present invention. As a result of the determination at S3, when the determination is made that the DVD 1 is the disk which copes with the synchronized multi-angle reproduction of the present invention (step S3; YES), the sequence goes to step S4, and when the determination is made that the DVD 1 is a normal disk (step S3; NO), the sequence goes to step S6.

For the disk which copes with the synchronized multi-angle reproduction of the present invention, as mentioned above, the buffer memory 57, the first FIFO memory 58, the second FIFO memory 59, the third FIFO memory 60, the first decoder 61, the second decoder 62 and the third decoder 63 are set up respectively (step S4). When the system controller 64 starts the reproducing operation, the synchronized multi-angle operation program stored in ROM, not shown, is activated (step S5).

On the other hand, for a normal disk, only the buffer memory 57, the first FIFO memory 58 and the first decoder 61 are set up (step S6). When the system controller 64 starts the reproducing operation, the normal operation program stored in ROM, not shown, is activated (step S7).

After step S5 or step S7, a program selection menu is displayed (step S8). Namely, a list of programs corresponding to selectable plural titles is displayed on a screen according to contents shown on the menu-use VOBS 22 of the VMG 20 (see FIG. 1). A user operates the manipulating portion 65 (FIG. 3), for example, and can select a desired program from the list. Thereafter, the actual reproducing operation is started according to the selected program (step S9). At this time, at the time of the normal operation, data for 1 screen is reproduced, and at the time of the multi-angle operation, data for 3 screens, for example, are reproduced.

Figure 9:
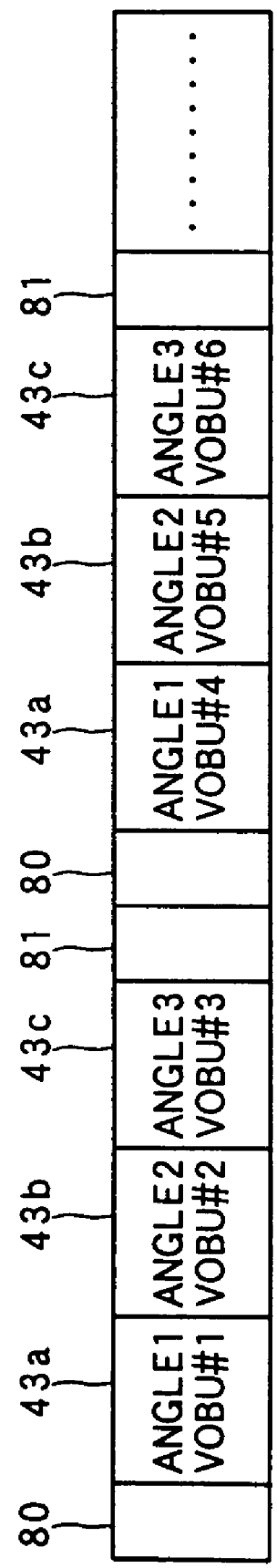
FIG. 9 is a diagram showing a modified example of the data structure of the synchronized multi-angle process according to the embodiment of the present invention.

There will be described below a modified example of the synchronized multi-angle process of the present embodiment with reference to FIG. 9. The modified example shown in FIG. 9 is the same as the case of FIG. 4 in that data are divided into VOBUs 43a, 43b and 43c as the data units corresponding to the three multi-angles and are recorded onto the DVD 1 alternatively. FIG. 9 is different from FIG. 4 in the data structure that a unit header 80 is provided to a head portion of one set of data units and an audio packet 81 attached to the VOBU 43c of the angle 3 is provided.

A code pattern, which corresponds to synchronized information which represents that one set of the data units composed of the three VOBUs 43a, 43b and 43c should be reproduced synchronously, is written in the unit header 80. Therefore, upon the synchronized multi-angle reproduction, after the unit header 80 is first read and one set of the data units to be reproduced synchronously are discriminated, the memory transmitting process and the decoding process are executed. In the example of FIG. 4, since the data units are recorded according to the predetermined order, the synchronous reproduction can be executed without providing the unit header 80, but the unit header 80 should be provided in order to improve versatility. Moreover, in the case where the reproduction is executed from the DVD 1 from a mid-way portion but not from the head, the unit header 80 is identified so that one set of the data units to be synchronously reproduced can be discriminated immediately. Here, also various address information and time information can be written onto the unit header 80.

The audio packet 81 includes audio data which are common to the three VOBUs 43a, 43b and 43c. Namely, in view of the form of use of the synchronized multi-angle reproduction, since a common sound generally has correspondence to plural screens, it is less useless that one audio datum has correspondence to plural angles, and thus a data amount can be saved. For this reason, as shown in FIG. 9, the audio packet 81 is provided with it being attached to the VOBU 43c to be synchronously reproduced, and when the decoding process is executed on the angle 3, for example, the audio data are decoded so as to be output from a speaker as a sound common to the respective angles at the time of the actual reproduction. As a result, the efficient process can be executed. Here, the audio packet 81 can be attached not only to the data unit of the angle 3 but also to data units of another angles.

There will be described below an example of a multi-angle image reproduced by the information recording/reproducing apparatus of the present embodiment with reference to FIG. 10. In the example of FIG. 10, when the DVD 1 which copes with the synchronized multi-angle reproduction of the present invention is set in the information recording/reproducing apparatus and the reproduction is started, the image corresponding to the first angle is reproduced synchronously on a screen 90, the image corresponding to the second angle is reproduced synchronously on a screen 91, and the image corresponding to the third angle is reproduced synchronously on a screen 92. These three images may be plural images which are obtained by simultaneously imaging a predetermined object from a plurality of different angles as shown in FIG. 10, but may be plural images which are obtained by imaging different objects simultaneously or separately. Moreover, the display layout of a plurality of images to be reproduced can be freely determined.

In FIG. 10, in the case where a sound corresponding to each angle is output, it is necessary to connect the speaker. At this time, one sound system for all the angles may be provided, but individual sound systems for respective angles may be provided. Moreover, in the case where the multi-angle image is used as interior, it is not necessary to output the sound from the speaker.

FIGS. 11A through 11D are drawings showing various layout examples of screens where the multi-angle image to be reproduced by the information recording/reproducing apparatus of the present embodiment is displayed. For example, as shown in FIG. 11A, three screens are arranged laterally, and the images which spread in the lateral direction may be reproduced simultaneously. Moreover, as shown in FIG. 11B, four screens are arranged in two lines and two rows, and they are provisionally used as a large screen so that the images are reproduced simultaneously. Further, as shown in FIG. 11C, a screen is provided to each wall in a room, and images which improves the effect of interior are reproduced simultaneously, or a plurality of screens are arranged so as to surround the seats for audience and a panoramic image may be reproduced simultaneously. Moreover, as shown in FIG. 11D, 3 to 4 screens are arranged on side surfaces of a pillar, and one subject is displayed from various directions like a fish tank, and the image may be reproduced simultaneously and three-dimensionally. Further, respective screens are arranged separately per corner in order to exhibit merchandise, and the images are reproduced simultaneously.

As mentioned above, according to the information recording/reproducing apparatus of the present embodiment, a plurality of image data corresponding to a plurality of images are divided into data units such as the VOBUs 43 so as to be recorded alternatively onto the DVD 1, and the divided image data are synchronized with each other so as to be reproduced. Therefore, in the conventional multi-angle, only an image from one angle can be selectively reproduced, but in the synchronized multi-angle of the present invention, images from all the angles can be reproduced simultaneously, and thus the DVD 1 can be applied to various uses. Moreover, since the above-mentioned data structure and the memory control are adopted, the images from the respective angles can be easily synchronized with each other upon the reproduction.

Here, the above embodiment described the case where the present invention is applied to DVD, but the present invention can be applied to another optical disk systems similarly. Moreover, the above embodiment described the case that the MPEG system is used as the compressing encoding system of image data, but the present invention can be applied even to the case where another compressing encoding systems are used.

In addition, the recording medium of the present invention is not limited to an optical disk, and thus a magnetic disk, a magnet-optical disk, a magnetic tape and the like may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-326937 filed on Nov. 17, 1998 including the specification, claims, drawings and summary is incorporated herein by reference in its entirety.

What is claimed is:

1. A method of reproducing at least first images and second images simultaneously, synchronizing the first images with the second images, the method comprising the processes of:
    reading first image data which is compressed data representing the first images and second image data which is compressed data representing the second images from a recording medium;
    storing the first image data read from the recording medium into a first memory device and storing the second image data read from the recording medium into a second memory device; and
    separately and simultaneously decoding the first image data stored in the first memory device and the second image data stored in the second memory device by using a first decoding device for decoding the first image data and a second decoding device for decoding the second image data,
    wherein, on the recording medium, each of the first image data and the second image data is divided into a plurality of data units each having an equal time length, each of the data units of the first image data and each of the data units of the second image data are alternately arranged on the recording medium, the data units are sequentially read from the recording medium in an order of an arrangement of the data units recorded on the recording medium, the process of storing the first image data and the process of storing the second image data are alternately carried out for each of the data units, and the process of decoding the first image data and the process of the second image data are carried out at a same decoding rate in a parallel manner.

2. The method according to claim 1, wherein the first image data and the second image data are recorded on the recording medium in accordance with a DVD standard, and each of the plurality of data units includes one or a plurality of video object units (VOBUs).

3. The method according to claim 1, wherein the first image data and the second image data are generated by converting variable rate compressed data compressed by using an MPEG (Moving Picture Expert Group) compression method into fixed rate compressed data.

4. The method according to claim 1, wherein, on the recording medium, a plurality of data sets each comprising one of the data units of the first image data and one of the data units of the second image data that is located next to the one of the data units of the first image data include audio data respectively, and the audio data is decoded in a way that a reproduction of the audio data is synchronized with a reproduction of the first images and a reproduction of the second images.

5. The method according to claim 1, wherein, on the recording medium, a plurality of data sets each comprising one of the data units of the first image data and one of the data units of the second image data that is located next to the one of the data units of the first image data include synchronization data respectively, and the process of decoding the first image data and the second image data are carried out by using the synchronization data so as to synchronize a reproduction of the first images with a reproduction of the second images.

6. The method according to claim 1 further comprising the process of monitoring an amount of the first image data stored in the first memory device and an amount of the second image data stored in the second memory device in order to prevent overflow or underflow in the first memory device and overflow or underflow in the second memory device.

7. An apparatus for reproducing at least first images and second images simultaneously, synchronizing the first images with the second images, the apparatus comprising:
    a reading device for reading first image data which is compressed data representing the first images and second image data which is compressed data representing the second images from a recording medium;
    a first memory device for storing the first image data read from the recording medium;
    a second memory device for storing the second image data read from the recording medium;
    a first decoding device for decoding the first image data stored in the first memory device; and
    a second decoding device for decoding the second image data stored in the second memory device,
    wherein, on the recording medium, each of the first image data and the second image data is divided into a plurality of data units each having an equal time length, each of the data units of the first image data and each of the data units of the second image data are alternately arranged on the recording medium, the reading device sequentially reads the data units from the recording medium in an order of an arrangement of the data units recorded on the recording medium, an operation of storing the first image data into the first memory device and an operation of storing the second image data into the second memory device are alternately carried out for each of the data units, and the first decoding device and the second decoding device separately and simultaneously decode the first image data and the second image data at a same decoding rate.

8. The apparatus according to claim 7, wherein the first image data and the second image data are recorded on the recording medium in accordance with a DVD standard, and each of the plurality of data units includes one or a plurality of video object units (VOBUs).

9. The apparatus according to claim 7, wherein the first image data and the second image data are generated by converting variable rate compressed data compressed by using an MPEG (Moving Picture Expert Group) compression method into fixed rate compressed data.

10. The apparatus according to claim 7, wherein, on the recording medium, a plurality of data sets each comprising one of the data units of the first image data and one of the data units of the second image data that is located next to the one of the data units of the first image data include audio data respectively, and the audio data is decoded in a way that a reproduction of the audio data is synchronized with a reproduction of the first images and a reproduction of the second images.

11. The apparatus according to claim 7, wherein, on the recording medium, a plurality of data sets each comprising one of the data units of the first image data and one of the data units of the second image data that is located next to the one of the data units of the first image data include synchronization data respectively, and the first decoding device and the second decoding device decode the first image data and the second image data by using the synchronization data so as to synchronize a reproduction of the first images with a reproduction of the second images.

12. The apparatus according to claim 7 further comprising a monitoring device for monitoring an amount of the first image data stored in the first memory device and an amount of the second image data stored in the second memory device in order to prevent overflow or underflow in the first memory device and overflow or underflow in the second memory device.

13. The apparatus according to claim 7, wherein at least said first images and said second images are arranged laterally, and a series of images are reproduced as a combination of at least said first images and said second images.

14. The apparatus according to claim 7, wherein at least said first images and said second images are arranged on an approximately same plane, and a series of images are reproduced as a combination of at least said first images and said second images.

15. The apparatus according to claim 7, wherein at least said first images and said second images are arranged vertically, and a series of images are reproduced as a combination of at least said first images and said second images.

16. The apparatus according to claim 7, wherein at least said first images and said second images are arranged three-dimensionally, and a series of images are reproduced as one subject so as to display the subject from various directions.

17. The apparatus according to claim 7 further comprising an outputting device which outputs sound unified with respect to at least said first images and said second images reproduced simultaneously.

* * * * *